POLARIZED ALARM AND COMMUNICATION MONITORING SYSTEM

Filed Jan. 23, 1967 2 Sheets-Sheet 1

INVENTORS.
ROBERT BEATON McLEOD &
FOSTER EARLE WELD
BY
Meyer, Tilberry & Body
ATTORNEYS INVENTORS.
ROBERT BEATON McLEOD &
FOSTER EARLE WELD
BY
*Meyer, Tilberry & Body*
ATTORNEYS United States Patent Office 3,518,378

Patented June 30, 1970

3,518,378

POLARIZED ALARM AND COMMUNICATION MONITORING SYSTEM

Robert Beaton McLeod, Clinton, and Foster Earle Weld, Newton Highlands, Mass., assignors, by mesne assignments, to Gulf & Western Systems Company, New York, N.Y., a corporation of Delaware Filed Jan. 23, 1967, Ser. No. 610,897
Int. Cl. H04m *11/04*
U.S. Cl. 179—5 7 Claims

ABSTRACT OF THE DISCLOSURE

A combined telephone-telegraphy communication system including a central station and a plurality of local stations connected together in series by a single metallic signal line across positive and negative output terminals of a central station direct current voltage source. The central station includes automatic grounding equipment for, upon an open circuit in the signal line, connecting the negative side of the source to ground and connecting the negative and positive output terminals together. Each local station is a polarized load and includes a circuit for, upon actuation, connecting the negative side of the load to ground to complete a ground return path to the central station.

This invention pertains to the art of communcations and, more particularly, to automatic grounding of a metallic line communication system to permit uninterrupted communications during an open line condition between a central station and a polarized local station.

The invention is particularly applicable in conjunction with a fire or police call system, such as that disclosed in U.S. Pat. No. 3,384,714 which issued on May 21, 1968, assigned to the same assignee as the present invention, and will be described with reference thereto; although, it will be appreciated that the invention has broader applications.

The fire and police call system disclosed in U.S. Pat. No. 3,384,714, the disclosure of which is incorporated herein by reference, is a combined telephone-telegraphy communication system. Briefly, that system includes a central station and a plurality of series connected local stations connected together in a series communication loop extending from the central station. Direct current, obtained from a central station voltage source, normally flows in a given direction through the communication loop. Each local station includes a telephone handset, which when lifted results in a coded frequency signal, representative of that station, being transmitted over the communication loop to the central station. Thereafter, voice communication between the central station and the calling local station is had over the communication loop. The operating power for the equipment at the local station is obtained from the direct current flowing in the loop, which current must flow in a given direction in order to energize the equipment, thereby rendering the local station a polarized load.

Municipalities that desire to convert their typical fire alarm system to a combined telephone-telegraphy system, as described above, may find it desirable that voice and signal communications be maintained over the communication loop even during an open circuit condition of the loop. Also, it is possible that during a lightning storm a static charge may build up on the communication loop which would attempt to discharge to ground at a local station through air gaps between the electrical components and a surrounding metal casing. As a result, various components, such as transistors, may be destroyed.

The present invention is directed toward an improved communication system which permits uninterrupted voice and signal communications over a communication loop, as described above, even in the event of an open circuit condition of the loop. The improved communication system also provides means to prevent static charge built up on the communication loop due to a lightning storm from being discharged through the local station equipment.

The invention contemplates a communication system including a central station and a plurality of series connected local stations connected together in a direct current carrying series communication loop extending from the central station. Each local station includes a polarized load having signal transmitting and receiving means, and normally closed switching means, such as a handset actuated switch, in series with the communication loop for shunting the load so that when the switching means is opened, the polarized load receives operating power from the direct current to permit communications between the central station and the calling local station through the communication loop. It is further contemplated that the central station include means for communicating with the local stations, a direct current voltage source, a positive output terminal and a negative output terminal connected to opposite ends of the communication loop.

In accordance with the present invention, the improved communication system serves to maintain communications between the central station and one of the local stations in the event of an open circuit in the communication loop between one of the output terminals and one of the local stations, and comprises: automatic grounding means responsive to an open circuit condition of the communication loop for connecting the positive and negative output terminals together, and connecting the negative side of the voltage source to ground; and, each of the local stations includes grounding means for connecting the negative side of the polarized load to ground, thereby completing a ground return path between the local station and the central station.

In accordance with a more limited aspect of the present invention, the local station grounding means includes a normally open switch which is operatively connected to the normally closed switching means so that when the latter is open, the former is closed to connect the negative side of the load to ground.

In accordance with another aspect of the present invention, a pair of normally open switching means are connected in series and on opposite sides of the polarized load to prevent static charge on a communication line from being discharged to ground through the polarized load.

The primary object of the present invention is to provide an improved communication system which permits uninterrupted voice and signal communications between a local station and a central station even during an open circuit condition of the interconnecting communication loop.

It is a still further object of the present invention to provide an improved communication system which is simple in construction and economical to manufacture.

The foregoing and other objects and advantages of the invention will become apparent from the following description of the preferred embodiment of the invention as read in connection with the accompanying drawings in which.

GENERAL DESCRIPTION

Figure 1:
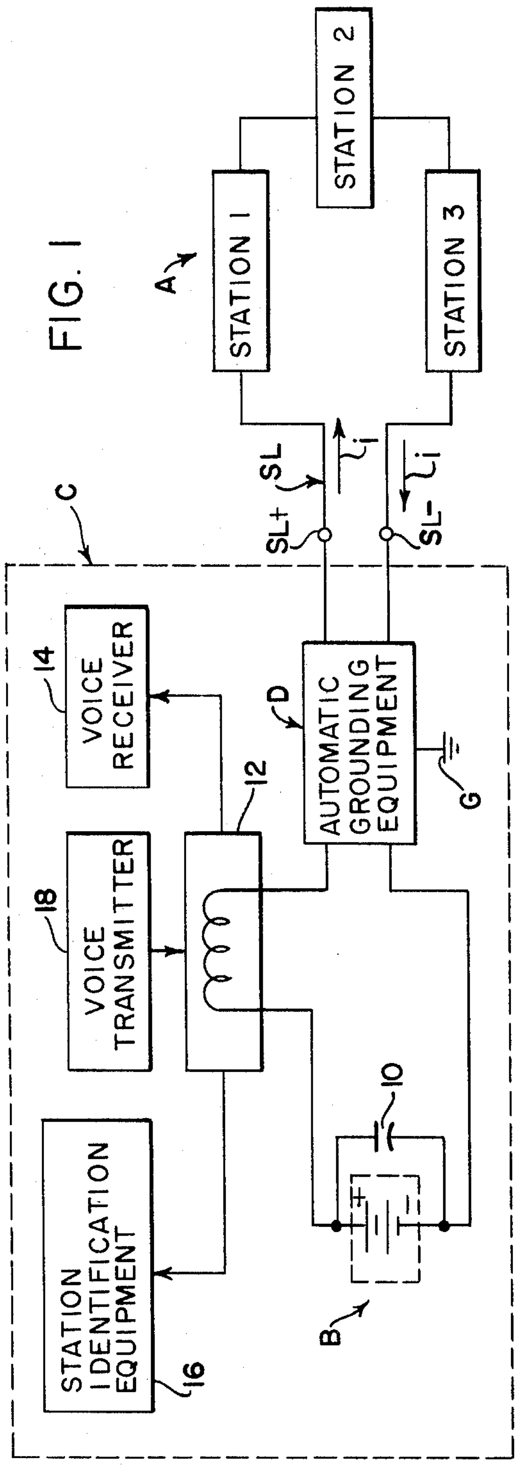
FIG. 1 is a schematic block diagram illustrating a plurality of series connected local stations and a central station.

Referring now to the drawings and, more particularly, to FIG. 1, there is illustrated, in block diagram form, a communication system as applied to a combined telephone-telegraphy system, which is preferably constructed as disclosed in U.S. Pat. No. 3,384,714, and which generally includes a communication loop A including a plurality of local fire alarm stations 1, 2 and 3 connected together in series by means of a single metallic signal line SL across positive and negative output terminals SL+ and SL— of a central station C. Output terminals SL+ and SL— are respectively connected across the positive and negative sides of a central station direct current voltage source, such as battery B, so that direct current, on the order of 100 milliamperes, normally flows through signal line SL as indicated by the direction of the arrows *i*. As discussed in greater detail in U.S. Pat. No. 3,384,714, each of the local stations 1, 2 and 3 includes means for transmitting a distinctive coded frequency signal, identifying the calling local station, to the central station C as well as means for transmitting and receiving voice frequency signals to and from the central station. Thus, a capacitor 10 is connected across battery B to prevent the coded and voice frequency signals from being coupled to the battery and its related central station equipment. In addition to battery B, the central station equipment described in that application also includes signal separation circuitry 12 connected in series in the signal line SL, and which serves to separate the received voice frequency signals from the received coded frequency signals. The voice frequency signals are coupled to a voice receiver 14 and the coded frequency signals are coupled to station identification equipment 16. Also, the central station includes voice transmitting means 18 for purposes of providing two way voice communications with the calling station.

CENTRAL STATION AUTOMATIC GROUNDING EQUIPMENT

Figure 2:
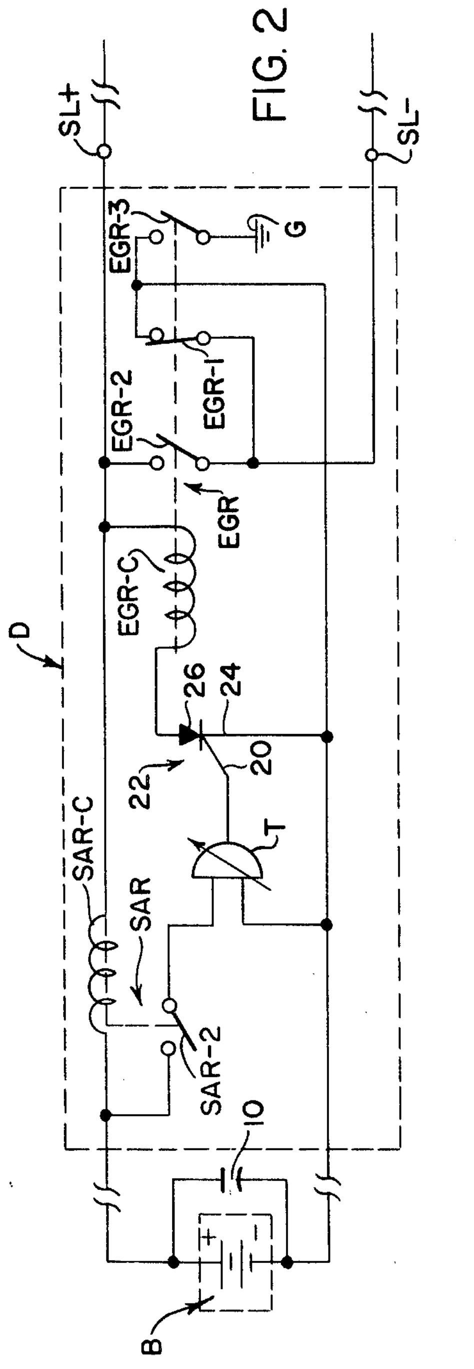
FIG. 2 is a combined schematic block diagram of automatic grounding equipment; and, FIG. 3 is a schematic diagram illustrating, in greater detail, the preferred embodiment of the invention.

In accordance with the present invention, the central station C, in addition to having the equipment described above and as disclosed in U.S. Pat. No. 3,384,714, also includes automatic grounding equipment D. The automatic grounding equipment serves to sense an open circuit condition of signal line SL, and in response thereto connects the negative output terminal SL— to the positive output terminal SL+ and connects the negative side of battery B to ground G. The automatic grounding equipment D may take the form as disclosed in U.S. Pat. No. 3,448,443, issued June 3, 1969, and assigned to the same assignee as the present invention, the disclosure of which is herein incorporated by reference. The relevant portion of the automatic equipment shown in that patent is illustrated in FIG. 2.

The automatic grounding equipment D includes a signal alarm relay SAR having a coil SAR–C connected in series with the signal line SL between the positive side of battery B and the positive output terminal SL+. Relay SAR also includes normally open relay contacts SAR–2 connected between the junction of the positive side of the battery B and coil SAR–C and an input of a timer T. Timer T, for example, may take the form of a unijunction transistor RC relaxation oscillator circuit, which upon application of a positive signal to its input circuit serves, after a predetermined period of time, to develop at its output circuit a positive gating signal. The output circuit of timer T is connected to the gate 20 of a silicon controlled rectifier 22, having its cathode 24 connected to the negative side of battery B. The anode 26 of rectifier 22 is connected through coil EGR–C of emergency ground relay EGR to the positive output terminal SL+. Relay EGR also includes normally closed contacts EGR–1, normally open contacts EGR–2 and normally open contacts EGR–3. Normally closed contacts EGR–1 serve to normally connect the negative output terminal SL— to the negative side of battery B. Normally open contacts EGR–2 serve, when closed, to connect the negative output terminal SL— to the positive output terminal SL+. The normally open contacts EGR–3 serve, when closed, to connect the negative side of battery B to ground G.

GROUNDING AND RELATED EQUIPMENT AT EACH LOCAL STATION

Figure 3:
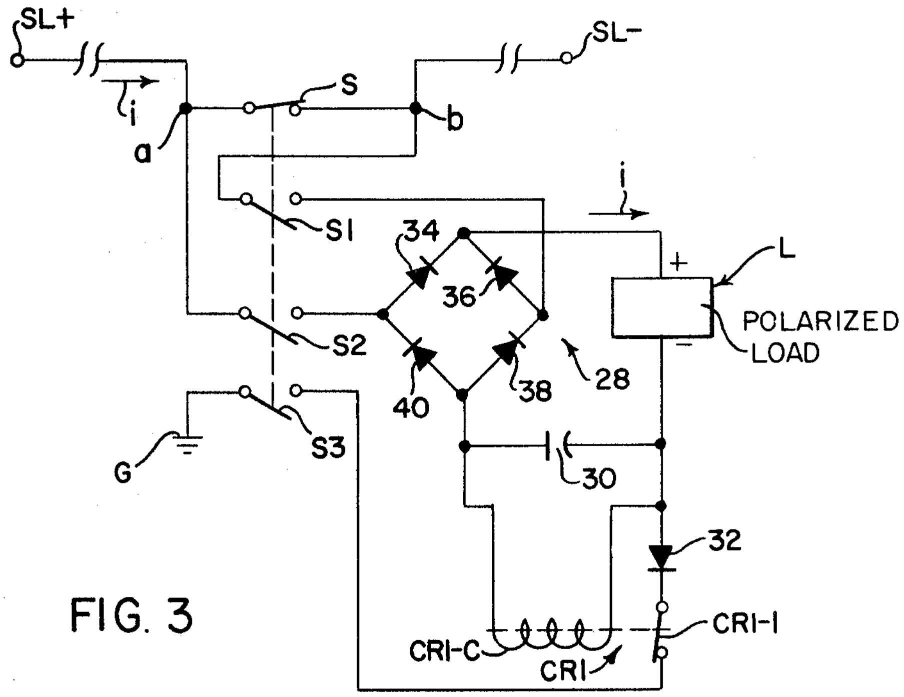

In accordance with the present invention, the grounding and related equipment at each local station 1, 2 or 3 takes the form as shown by the schematic circuit diagram of FIG. 3. The normally closed switch S and the polarized load L, as shown in FIG. 3, respectively correspond with the normally closed switch S, and the remaining circuitry illustrated in FIG. 2 of the U.S. Pat. No. 3,384,715. As discussed in that patent, so long as switch S is closed, direct current flows through the switch S from terminal *a* to terminal *b*, shunting the polarized load L. However, when switch S is opened, as upon lifting a telephone handset at the local station, current flows from the positive to the negative side of load L to energize the equipment therein for transmitting voice and coded frequency signals over the signal line SL to the central station C. In accordance with the present invention, the equipment added for each local station 1, 2 and 3 includes normally open switches S1, S2 and S3, which are operatively connected to switch S, so that when the latter is opened the former become closed. The additional equipment also includes a diode bridge 28, a relay CR1, a capacitor 30, and a diode 32.

The diode bridge 28 includes diode rectifiers 34, 36, 38 and 40, poled as shown in FIG. 3. Normally open switch S1 serves to connect the junction of diodes 36 and 38 with terminal *b* and normally open switch S2 serves to connect the junction of diodes 34 and 40 with terminal *a*. The positive side of load L is connected to the junction of the cathodes of diodes 34 and 36, and the negative side of load L is connected to the junction of the anodes of diodes 38 and 40 through coil CR1–C of relay CR1. A capacitor 30 is connected in parallel with coil CR1–C for purposes of effectively short circuiting the coil during the period that frequency signals are transmitted between the central station and this local station, so that the signals are not unduly attenuated by the coil. Normally open swich S3 serves, when closed, to connect the negative side of load L to ground G through diode 32, poled as shown in FIG. 3, and normally closed relay contacts CR1–1.

OPERATION

During normal operation of the combined telephone-telegraphy system, switch S of each local station is closed so that the direct current flowing in signal line SL bypasses the local station. In the event that static charge is placed on the signal line during a lightning storm, normally open switches S1 and S2 serve to prevent the charge from discharging through diodes 34 or 36 and the polarized load L.

Assume now that a telephone handset at the local station, illustrated in FIG. 3, is lifted. Normally closed switch S becomes open and normally open switches S1, S2 and S3 become closed. Direct current flows from the positive output terminal SL+ through the signal line SL to terminal *a* at the local station and, thence, in the local station through switch S2, diode 34, polarized load L from its positive to negative side, relay coil CR1–C, diode 38, switch S1 and, thence, from terminal *b* through the signal line SL to the negative output terminal SL—. The polarized load becomes energized to transmit voice and coded frequency signals through signal line SL to the central station, in the manner as discussed in U.S. Pat. No. 3,384,714. Relay CR1 is energized and its associated contacts CR1–1 are open.

Capacitor 30 serves to essentially short circuit relay coil CR1–C when voice frequency signals are being transmitted, thereby preventing the resultant high impedance of the coil from attenuating the voice signal.

Assume now that a break occurs between the positive output terminal through relay coil CR1–C and, hence, the relay becomes de-energized and its contacts CR1–1 close, connecting the negative side of load L to ground G. At the central station the automatic grounding equipment D serves, in response to this open circuit condition, to connect the negative output terminal SL— to the positive output terminal SL+, and to connect the negative side of battery B to ground G. More particularly, upon an open circuit condition in the signal line SL, relay SAR becomes de-energized, whereupon its normally open contacts SAR–2 becomes closed to apply a positive signal to timer T. After a predetermined period of time, timer T applies a positive gating signal to gate 20 of the silicon controlled rectifier 22. Thus, current flows from the positive side of battery B through coil SAR–C and, thence, through coil EGR–C and through the anode to cathode of rectifier 22 to the negative side of battery B. This energizes relay EGR, whereupon its normally closed contact EGR–1 becomes open, and its normally open contacts EGR–2 and EGR–3 become closed. Thus, the negative output terminal SL— is connected to positive output terminal SL+, and the negative side of battery B is connected to ground G.

Direct current will now flow through the local station from terminal *b*, through switch S1, diode 36, the load L from its positive to negative side, diode 32, now closed relay contacts CR1–1, switch S3, and then to ground to complete a ground return path to the negative side of battery B.

Assume now that an open circuit condition exists between terminal *b* and the negative output terminal SL—. The automatic grounding equipment D will connect the negative terminal SL— to the positive terminal SL+. Accordingly, current will flow through the local station, FIG. 3, from terminal *a*, through switch S2, diode 34, load L from its positive to negative side, diode 32, now closed relay contacts CR1–1, switch S3, and then to ground G to complete the ground return path to the negative side of battery B.

The invention has been described in connection with a particular preferred embodiment, but is not to be limited to same. Various modifications may be made without departing from the scope and spirit of the present invention as defined by the appended claims.

Having thus described our invention, we claim:

1. In a communication system having a central station and a plurality of series connected local stations connected together in a direct current carrying series communication loop extending from said central station; each said local station including a polarized load having signal transmitting and receiving means and normally closed switching means in series with said communication loop and shunting said load so that when said switching means is opened said polarized load receives operating power from said direct current for communicating with said central station through said communication loop; said central station including transmitting and receiving means for communicating with said local station, a positive output terminal and a negative output terminal respectively connected to opposite ends of said communication loop, and including a direct current voltage source:

the improvement for maintaining communication between said central station and one of said local stations in the event of an open circuit in said loop between one of said output terminals and said one local station and comprising:

automatic grounding means responsive to an open circuit condition of said communication loop for connecting said positive and negative central station output terminal together and connecting the negative side of said voltage source to ground; and each said local station having grounding means for connecting the negative side of said polarized load to ground while the positive side of said polarized load remains connected to said positive output terminal through either side of said communication loop, thereby completing a ground return path between said local station and said central station in the event one side of said communication loop has an open circuit condition.

2. In a communication system as set forth in claim 1, wherein said local station grounding means includes normally open switching means operatively connected to said normally closed switching means so that when the latter is opened the former is closed to connect the negative side of said load to ground.

3. In a communication system having a central station and a plurality of series connected local stations connected together in a direct current carrying series communication loop extending from said central station; each said local station including a polarized load having signal transmitting and receiving means and normally closed switching means in series with said communication loop and shunting said load so that when said switching means is opened said polarized load receives operating power from said direct current for communicating with said central station through said communication loop; said central station including means for communicating with said local stations, a positive output terminal and a negative output terminal respectively connected to opposite ends of said communication loop, and including a direct current voltage source;

the improvement for maintaining communication between said central station and one of said local stations in the event of an open circuit in said loop between one of said output terminals and said one local station and comprising:

automatic grounding means responsive to an open circuit condition of said communication loop for connecting said positive and negative central station output terminals together and connecting the negative side of said voltage source to ground;

each said local station having grounding means for connecting the negative side of said polarized load to ground, thereby completing a ground return path between said local station and said central station, each local station includes a relay having normally closed contacts and a coil, said coil being connected in series with said load across said normally closed switching means and said contacts being connected between the negative side of said load and ground so that when said normally closed switching means is opened to energize said load and said relay by said direct current flow from said load loop a subsequent de-energization of said relay, as upon an open circuit condition of said loop, causes said relay contacts to close and thereby complete a ground return path from the negative side of said load to said central station.

4. In a communication system as set forth in claim 3, wherein each said local station includes a normally open switching means connected in series between said relay contacts and ground, said normally open switching means being operatively connected to said normally closed switching means so that when the latter is opened the former is closed to complete a ground return path from the negative side of said load to said central station.

5. In a communication system as set forth in claim 4, including a capacitor connected in parallel with said relay coil, said capacitor serving to effectively short circuit said coil during the periods that frequency signals are transmitted between said central station and said local station so that said signals are not unduly attenuated by said coil.

6. In a communication system as set forth in claim 5, including a diode bridge circuit having four arms, each including a diode; first and second nonadjacent diodes of said bridge circuit respectively connecting said positive output terminal to the positive side of said load and the negative side of said load to said negative terminal; and third and fourth nonadjacent diodes of said bridge circuit respectively connecting said negative output terminal to the positive side of said load and the negative side of said load to said positive output terminal.

7. In a communication system having a central station and a plurality of series connected local stations connected together in a direct current carrying series communication loop extending from said central station; each said local station including a polarized load having signal transmitting and receiving means and normally closed switching means in series with said communication loop and shunting said load so that when said switching means is opened said polarized load receives operating power from said direct current for communicating with said central station through said communication loop; said central station including means for communicating with said local stations, a positive output terminal and a negative output terminal respectively connected to opposite ends of said communication loop, and including a direct current voltage source;

the improvement for maintaining communication between said central station and one of said local stations in the event of an open circuit in said loop between one of said output terminals and said one local station and comprising:

automatic grounding means responsive to an open circuit condition of said communication loop for connecting said positive and negative central station output terminals together and connecting the negative side of said voltage source to ground;

each said local station having grounding means for connecting the negative side of said polarized load to ground, thereby completing a ground return path between said local station and said central station, a pair of normally open switching means connected in series with and respectively located on opposite sides of said load to define a series circuit, said series circuit being connected in parallel with said normally closed switching means so that said normallc open switching means serve, when open, to prevent static charge on said signal line from being discharged through said load.

References Cited

UNITED STATES PATENTS

| | | | |
|---|---|---|---|
| 1,105,044 | 7/1914 | Schumann | 340—292 |
| 2,186,163 | 1/1940 | Bridges et al. | 340—292 |
| 2,250,928 | 7/1941 | Donovan | 340—292 |
| 3,448,447 | 6/1969 | Tetherow | 340—292 |

KATHLEEN H. CLAFFY, Primary Examiner

J. S. BLACK, Assistant Examiner

U.S. Cl. X.R.

340—292